(12) United States Patent
Ko et al.

(10) Patent No.: US 10,923,721 B2
(45) Date of Patent: Feb. 16, 2021

(54) NEGATIVE ELECTRODE FOR A RECHARGEABLE LITHIUM BATTERY AND RECHARGEABLE LITHIUM BATTERY COMPRISING SAME

(71) Applicant: SAMSUNG SDI CO., LTD., Yongin-si (KR)

(72) Inventors: Seongjae Ko, Yongin-si (KR); Jae Hou Nah, Yongin-si (KR)

(73) Assignee: Samsung SDI Co., Ltd., Yongin-Si (KR)

( * ) Notice: Subject to any disclaimer, the term of this patent is extended or adjusted under 35 U.S.C. 154(b) by 304 days.

(21) Appl. No.: 15/297,188

(22) Filed: Oct. 19, 2016

(65) Prior Publication Data

US 2017/0133681 A1    May 11, 2017

(30) Foreign Application Priority Data

Nov. 10, 2015 (KR) .................. 10-2015-0157490

(51) Int. Cl.
| | |
|---|---|
| *H01M 4/13* | (2010.01) |
| *H01M 4/587* | (2010.01) |
| *H01M 4/133* | (2010.01) |
| *H01M 4/62* | (2006.01) |
| *H01M 4/02* | (2006.01) |
| *H01M 10/0525* | (2010.01) |

(52) U.S. Cl.
CPC ........... *H01M 4/587* (2013.01); *H01M 4/133* (2013.01); *H01M 4/622* (2013.01); *H01M 10/0525* (2013.01); *H01M 2004/021* (2013.01); *H01M 2004/027* (2013.01); *H01M 2220/30* (2013.01)

(58) Field of Classification Search
CPC ...... H01M 4/587; H01M 4/133; H01M 4/622; H01M 4/364; H01M 10/052; H01M 10/0525; H01M 2004/021; H01M 2004/027; H01M 2220/20; H01M 2220/30; C01B 31/02; H01G 11/24; H01G 11/38; H01G 11/42; H01G 11/50; Y02E 60/122; Y02E 60/13
See application file for complete search history.

(56) References Cited

U.S. PATENT DOCUMENTS

| | | | |
|---|---|---|---|
| 2009/0053607 A1 | 2/2009 | Jeong et al. | |
| 2014/0234708 A1* | 8/2014 | Park ...................... | H01M 4/134 429/211 |
| 2015/0017549 A1 | 1/2015 | Nishimura et al. | |
| 2015/0236343 A1* | 8/2015 | Xiao ................ | H01M 10/0525 429/217 |
| 2015/0263347 A1* | 9/2015 | Imaji ...................... | C01B 31/02 429/231.8 |
| 2016/0133926 A1* | 5/2016 | Lee ..................... | H01M 10/052 429/224 |
| 2017/0005335 A1* | 1/2017 | Ko ........................ | H01M 4/386 |

FOREIGN PATENT DOCUMENTS

| | | |
|---|---|---|
| CN | 104900864 A | 9/2015 |
| CN | 104916810 A | 9/2015 |
| JP | 2001-143699 A | 5/2001 |
| KR | 10-2004-0007548 A | 1/2004 |
| KR | 10-2014-0137371 A | 12/2014 |
| WO | WO 2012/127561 A1 | 9/2012 |

\* cited by examiner

*Primary Examiner* — Raymond Alejandro
(74) *Attorney, Agent, or Firm* — Lee IP Law, PC (57) ABSTRACT

A negative electrode for a rechargeable lithium battery may include a negative electrode active mass layer including a negative active material having a Young's modulus of about 10 GPa to about 35 GPa and having an active mass density of greater than or equal to about 1.65 g/cc and a current density of greater than or equal to about 3.2 mAh/cm$^2$.

9 Claims, 5 Drawing Sheets

NEGATIVE ELECTRODE FOR A RECHARGEABLE LITHIUM BATTERY AND RECHARGEABLE LITHIUM BATTERY COMPRISING SAME

CROSS-REFERENCE TO RELATED APPLICATION

Korean Patent Application No. 10-2015-0157490, filed on Nov. 10, 2015, in the Korean Intellectual Property Office, and entitled: "Negative Electrode for A Rechargeable Lithium Battery and Rechargeable Lithium Battery Comprising Same," is incorporated by reference herein in its entirety.

BACKGROUND

1. Field

A negative electrode for a rechargeable lithium battery and a rechargeable lithium battery including the same are disclosed.

2. Description of the Related Art

Rechargeable lithium batteries may be used as power sources, e.g., for small portable electronic devices.

SUMMARY

Exemplary embodiments provide a negative electrode for a rechargeable lithium battery including a negative electrode active mass layer including a negative active material having a Young's modulus of about 10 GPa to about 35 GPa and having an active mass density of greater than or equal to about 1.65 g/cc and a current density of greater than or equal to about 3.2 mAh/cm$^2$.

The negative electrode may have an active mass density of about 1.65 g/cc to about 1.85 g/cc.

The negative electrode may have a current density of about 3.2 mAh/cm$^2$ to about 4.2 mAh/cm$^2$.

The negative active material may have a Young's modulus of about 15 GPa to about 25 GPa.

The negative active material may be artificial graphite.

The negative electrode active mass layer may include a binder. An amount of the binder may be about 1 wt % to about 5 wt %.

The negative electrode active mass layer may include a conductive material. An amount of the conductive material may be about 1 wt % to about 5 wt %.

Other exemplary embodiments provide a rechargeable lithium battery including the negative electrode of the exemplary embodiment described above; a positive electrode including a positive active material; and an electrolyte.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, active mass indicates a mixture of an active material, a binder, and, optionally, a conductive material. The mixture is mixed in a solvent to prepare a slurry-type active material composition. This active material composition is coated on a current collector and dried to form an active material layer. Herein, the active material layer is called an active mass layer. This active mass and the active mass layer are, in general, widely known in the related art and, thus, will not be described in detail.

In addition, active mass density indicates an active mass weight per a unit electrode volume.

A negative electrode for a rechargeable lithium battery according to one embodiment may include a negative electrode active mass layer including a negative active material having a Young's modulus of about 10 GPa to about 35 GPa. The negative electrode active mass layer may also have an active mass density of greater than or equal to about 1.65 g/cc and a current density of greater than or equal to about 3.2 mAh/cm$^2$.

The Young's modulus of the negative active material may be about 10 GPa to about 35 GPa, preferably, about 15 GPa to about 25 GPa, for example. When the negative active material has the specified Young's modulus, this active material may be applied to an electrode having a high current density. As a result, an electrode having a high active mass density and, thus, a battery having improved cycle-life characteristics and improved swelling characteristics may be provided.

In one embodiment, the Young's modulus may be measured using an in-situ SEM indentation experiment method. This method is performed by pressing down a probe while an active material in an in-situ state is examined with SEM. The Young's modulus is obtained by measuring a depth of the active material when pressed down with the probe and a pressure applied at that time.

As for a negative active material having the Young's modulus, artificial graphite, for example, may be appropriately used.

On the contrary, when an amorphous carbon is used as the negative active material having the Young's modulus, a high energy density may not be realized due to low capacity and efficiency.

The negative electrode of the exemplary embodiments may have an active mass density of greater than or equal to about 1.65 g/cc, preferably, about 1.65 g/cc to about 1.85 g/cc, for example. When the negative electrode has the specified active mass density, a battery having a high energy density may be provided.

The negative electrode may have a current density of greater than or equal to about 3.2 mAh/cm$^2$, preferably, about 3.2 mAh/cm$^2$ to about 4.2 mAh/cm$^2$, for example. When the negative electrode has the specified current density, a battery having a high energy density may be realized.

The negative electrode of one embodiment having an active mass density of greater than or equal to about 1.65 g/cc and a current density of greater than or equal to about 3.2 mAh/cm$^2$ may include a negative active material having a Young's modulus in a range of 10 GPa to 35 GPa and, thus, may improve cycle-life characteristics and swelling characteristics. However, when the negative electrode has the same Young's modulus as above but an active mass density or a current density out of the range, a high energy density may not be realized.

In a negative electrode according to one embodiment, the negative electrode active mass layer may include a binder and may, optionally, include a conductive material.

In the negative electrode active mass layer, an amount of the negative active material may be about 95 wt % to about 99 wt % based on the total weight of the negative electrode active mass layer.

In the negative electrode active mass layer, an amount of the binder may be about 1 wt % to about 5 wt % based on the total weight of the negative electrode active mass layer. When the negative electrode active mass layer further includes the conductive material, the negative electrode active mass layer may include about 90 wt % to about 98 wt % of the negative active material, about 1 wt % to about 5 wt % of the binder, and about 1 wt % to about 5 wt % of the conductive material.

The binder may improve binding properties of negative active material particles with one another and with a current collector. The binder may include, for example, a non-water-soluble binder, a water-soluble binder, or a combination thereof.

The non-water-soluble binder may include, for example, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include, for example, a rubber-based binder or a polymer resin binder. The rubber-based binder may be selected from, for example, a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from, for example, polytetrafluoroethylene, polyethylene, polypropylene, ethylene-propylene copolymer, polyethylene oxide, polyvinylpyrrolidone, polyepichlorohydrine, polyphosphazene, polyacrylonitrile, polystyrene, an ethylene-propylene-diene copolymer, a polyvinylpyridine, chlorosulfonated polyethylene, a latex, a polyester resin, an acrylic resin, a phenol resin, an epoxy resin, polyvinyl alcohol, and a combination thereof.

When the water-soluble binder is used as a negative electrode binder, a cellulose-based compound, for example, may be further used to provide viscosity. The cellulose-based compound may include, for example, one or more of carboxylmethyl cellulose, hydroxypropylmethyl cellulose, methyl cellulose, or alkali metal salts thereof. The alkali metal may be, for example, Na, K, or Li. The cellulose-based compound may be included in an amount of about 0.1 to about 3 parts by weight, for example, based on 100 parts by weight of the negative active material.

The conductive material may be included to provide electrode conductivity. Any electrically conductive material may be used as a conductive material unless it causes a chemical change. The conductive material may include, for example, a carbon-based material such as natural graphite, artificial graphite, carbon black, acetylene black, ketjen black, a carbon fiber and the like; a metal-based material of metal powder or metal fiber including copper, nickel, aluminum, silver, and the like; a conductive polymer such as a polyphenylene derivative; or a mixture thereof.

The current collector may include, for example, a copper foil, a nickel foil, a stainless steel foil, a titanium foil, a nickel foam, a copper foam, a polymer substrate coated with a conductive metal, and a combination thereof.

Another embodiment provides a rechargeable lithium battery including the negative electrode, a positive electrode including a positive active material, and an electrolyte.

The positive electrode may include a positive current collector and a positive electrode active mass layer formed on the positive current collector. The positive active material may include, for example, lithiated intercalation compounds that reversibly intercalate and deintercalate lithium ions. Preferably, a composite oxide of at least one of cobalt, manganese, nickel, or a combination thereof, and lithium may be used. Examples may be compounds represented by the following chemical formulae:

Li$_{-a}$A$_{1-b}$X$_b$D$_2$ (0.90≤a≤1.8, 0≤b≤0.5); Li$_a$A$_{1-b}$X$_b$O$_{2-c}$D$_c$ (0.90≤a≤1.8, 0≤b≤0.5, 0≤c≤0.05); Li$_a$E$_{1-b}$X$_b$O$_{2-c}$D$_c$ (0.90≤a≤1.8, 0≤b≤0.5, 0≤c≤0.05); Li$_a$E$_{2-b}$X$_b$O$_{4-c}$D$_c$ (0.90≤a≤1.8, 0≤b≤0.5, 0≤c≤0.05); Li$_a$Ni$_{1-b-c}$Co$_b$X$_c$D$_a$ (0.90≤a≤1.8, 0≤b≤0.5, 0≤c≤0.5, 0≤a≤2); Li$_a$Ni$_{1-b-c}$Co$_b$X$_c$O$_{2-a}$T$_a$ (0.90≤a≤1.8, 0≤b≤0.5, 0≤c≤0.05, 0≤a<2); Li$_a$Ni$_{1-b-c}$Co$_b$X$_c$O$_{2-a}$T$_2$ (0.90≤a≤1.8, 0≤b≤0.5, 0≤c≤0.05, 0≤a<2); Li$_a$Ni$_{1-b-c}$Mn$_b$X$_c$D$_a$ (0.90≤a≤1.8, 0≤b≤0.5, 0≤c≤0.5, 0≤a≤2); Li$_a$Ni$_{1-b-c}$Mn$_b$X$_c$O$_{2-a}$T$_a$ (0.90≤a≤1.8, 0≤b≤0.5, 0≤c≤0.05, 0≤a≤2); Li$_a$Ni$_{1-b-c}$Mn$_b$X$_c$O$_{2-a}$T$_2$ (0.90≤a≤1.8, 0≤b≤0.5, 0≤c≤0.05, 0<a<2); Li$_a$Ni$_b$E$_c$G$_d$O$_2$(0.90≤a≤1.8, 0≤b≤0.90, 0≤c≤0.5, 0001≤d≤0.1); Li$_a$Ni$_b$Co$_c$Mn$_d$G$_e$O$_2$ (0.90≤a≤1.8, 0≤b≤0.9, 0≤c≤0.5, 0≤d≤0.5, 0.0001≤e≤0.1); Li$_a$NiG$_b$O$_2$ (0.90≤a≤1.8, 0001≤b≤0.1); Li$_a$CoG$_b$O$_2$ (0.90≤a≤1.8, 0.001≤b≤0.1); Li$_a$Mn$_{1-b}$G$_b$O$_2$ (0.90≤a≤1.8, 0.001≤b≤0.1); Li$_a$Mn$_2$G$_b$O$_4$ (0.90≤a≤1.8, 0.001≤b≤0.1); Li$_a$Mn$_{1-g}$G$_g$PO$_4$(0.90≤a≤1.8, 0≤g≤0.5); QO$_2$; QS$_2$; LiQS$_2$; V$_2$O$_5$; LiV$_2$O$_5$; LiZO$_2$; LiNiVO$_4$; Li$_{(3-f)}$J$_2$(PO$_4$)$_3$(0≤f≤2); Li$_{(3-f)}$Fe$_2$(PO$_4$)$_3$(0≤f≤2); and Li$_a$FePO$_4$ (0.90≤a≤1.8).

In the above chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu. and a combination thereof.

The compounds may have a coating layer on the surface or may be mixed with another compound having a coating layer. The coating layer may include at least one coating element compound selected from the group consisting of, for example, an oxide of a coating element, a hydroxide of a coating element, an oxyhydroxide of a coating element, an oxycarbonate of a coating element, and a hydroxyl carbonate of a coating element. The compound for the coating layer may be amorphous or crystalline, for example. The coating element included in the coating layer may include, for example, Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since these methods may be well-known to those who work in the related field.

In the positive electrode, an amount of the positive active material may be about 90 wt % to about 98 wt % based on the total weight of the positive electrode active mass layer.

In one embodiment, the positive electrode active mass layer may further include a binder and a conductive material. Herein, the binder and conductive material may be included in an amount ranging from about 1 to about 5 wt % each based on the total weight of the positive electrode active mass layer.

The binder may improve binding properties of positive active material particles with one another and with a current collector. The binder may include, for example, polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and the like, but are not limited thereto.

The conductive material may improve conductivity of an electrode. Any electrically conductive material may be used as a conductive material, unless it causes a chemical change. The conductive material may be, for example, a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The current collector may be Al, for example, but is not limited thereto.

The electrolyte may include, for example, a non-aqueous organic solvent and a lithium salt.

The non-aqueous organic solvent may serve as a medium for transmitting ions taking part in the electrochemical reaction of a battery.

The non-aqueous organic solvent may be, for example, a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, and the like. The ether-based solvent may be, for example, dibutylether, tetraglyme, diglyme, dimethoxyethane, 2-methyltetrahydrofuran, tetrahydrofuran, and the like. The ketone-based solvent may be, for example, cyclohexanone, and the like. The alcohol-based solvent may be, for example, ethanol, isopropyl alcohol, and the like. The aprotic solvent may be, for example, nitriles such as R-CN (wherein R is a C2 to C20 linear, branched, or ring structured hydrocarbon group, or may include double bond, an aromatic ring or an ether bond), and the like; amides such as dimethylformamide, dioxolanes such as 1,3-dioxolane, sulfolanes, and the like.

The organic solvent may be used singularly or in a mixture. When the organic solvent is used in a mixture, the mixture ratio may be controlled in accordance with a desirable battery performance.

The carbonate-based solvent may include, for example, a mixture of a cyclic carbonate and a linear carbonate. The cyclic carbonate and linear carbonate may be mixed together in a volume ratio of about 1:1 to about 1:9. When the mixture is used as an electrolyte, the rechargeable lithium battery may have enhanced performance.

The organic solvent may further include, for example, an aromatic hydrocarbon-based organic solvent in addition to the carbonate based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

In Chemical Formula 1, $R^1$ to $R^6$ may be the same or different and may be selected from hydrogen, a halogen, a C1 to C10 alkyl group, a haloalkyl group, and a combination thereof.

The aromatic hydrocarbon-based organic solvent may be, for example, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by Chemical Formula 2 which may improve cycle life.

[Chemical Formula 2]

In Chemical Formula 2, $R_7$ and $R_8$ may be the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

The ethylene carbonate-based compound may include, for example, difluoro ethylenecarbonate, chloroethylene carbonate, dichloroethylene carbonate, bromoethylene carbonate, dibromoethylene carbonate, nitroethylene carbonate, cyanoethylene carbonate or fluoroethylene carbonate, and the like. The amount of the additive for improving cycle life may be flexibly used within an appropriate range.

The lithium salt may be dissolved in an organic solvent, may supply a battery with lithium ions, may basically operate the rechargeable lithium battery, and may improve transportation of the lithium ions between positive and negative electrodes. The lithium salt may include, for example, at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiCl_4$, $LiAlO_2$, $LiAlCl_4$, $LiN(C_xF_{2x+1}SO_2)(C_yF_{2y+1}SO_2)$ (where x and y are natural numbers, for example an integer ranging from 1 to 20), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a kind of the battery. A suitable separator material may include, for example, polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 1:
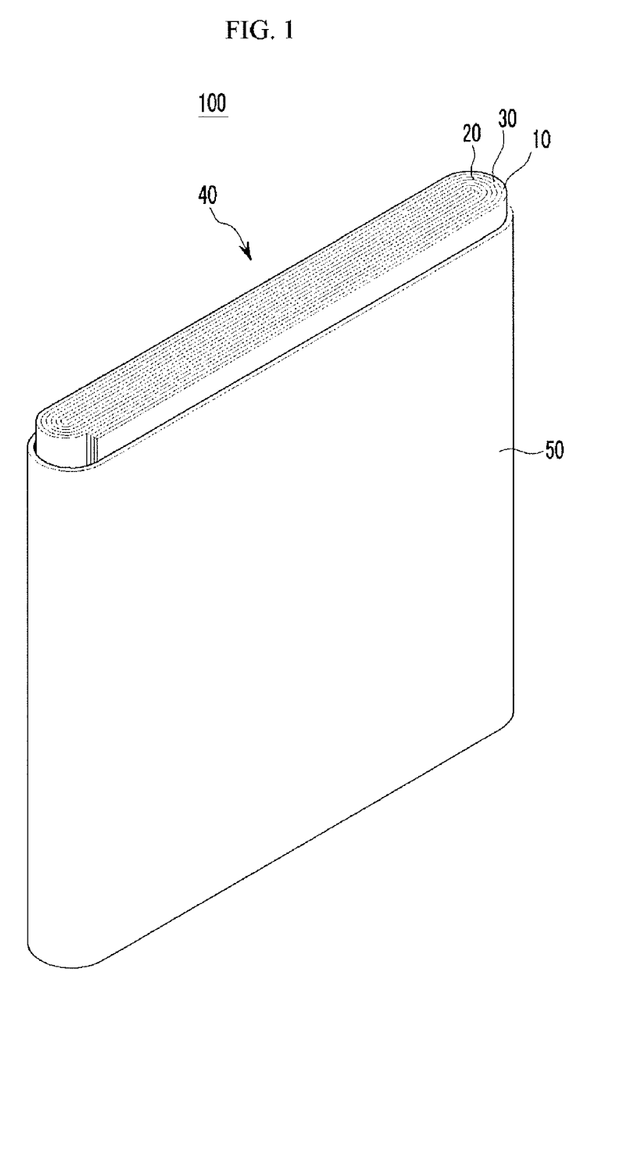
FIG. 1 illustrates a schematic view showing the structure of a positive active material according to one embodiment.

FIG. 1 is an exploded perspective view showing a rechargeable lithium battery according to one embodiment. The rechargeable lithium battery according to one embodiment is illustrated to have, for example, a prismatic shape, but is not limited thereto, and may have various shapes such as a cylinder, a pouch, and the like.

Referring to FIG. 1, a rechargeable lithium battery 100 according to one embodiment may include an electrode assembly 40 formed by placing a separator 30 between a positive electrode 10 and a negative electrode 20 and winding the same and a case 50 in which the electrode assembly 40 is received. The electrolyte solution may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

97.5 wt % of an artificial graphite negative active material having a Young's modulus of 20 GPa, 1 wt % of carboxyl methyl cellulose, and 1.5 wt % of a styrene-butadiene rubber were mixed in a water solvent to prepare a negative active material slurry.

The Young's modulus was measured by an In-situ SEM indentation method using PI85 SEM PicoIndenter (a conductive diamond cube-corner probe: Hysitron®, Inc. USA).

The negative active material slurry was coated on an 8 μm-thick Cu foil and pressed, to manufacture or produce a negative electrode having an active mass layer on a Cu foil. The negative electrode had an active mass density of 1.70 g/cc and a current density of 3.4 mAh/$cm^2$.

COMPARATIVE EXAMPLE 1

A negative electrode was prepared according to the same method as Example 1 except for using artificial graphite having a Young's modulus of 8 GPa as a negative active material. The negative electrode had an active mass density of 1.70 g/cc and a current density of 3.4 mAh/$cm^2$.

COMPARATIVE EXAMPLE 2

A negative electrode was prepared according to the same method as Example 1 except for using artificial graphite having a Young's modulus of 40 GPa as a negative active material. The negative electrode had an active mass density of 1.60 g/cc and a current density of 3.4 mAh/$cm^2$.

Slurry Pellet Density

The negative active materials according to Example 1 and Comparative Examples 1 to 2 were respectively prepared into a slurry pellet through the following process.

97.5 wt % of negative active material, 1 wt % of carboxyl methyl cellulose, and 1.5 wt % of styrene-butadiene rubber were mixed in a water solvent to prepare a negative active material slurry.

The negative active material slurry was poured into a container made of an aluminum foil and completely dried in a 110° C. oven. The dried slurry powder was finely ground with mortar and pestle and sieved with a 250 mesh sieve. 1 g of the sieved powder was put in a pellet jig and pressed with a pressure provided in Table 1 for 30 seconds to manufacture or produce a slurry pellet.

The slurry pellet was allowed to stand for 24 hours and the weight and thickness of the slurry pellet were then measured. The measured weight and thickness were used to calculate density of the slurry pellet and the results are provided in Table 1.

TABLE 1

|  | Pressure (ton) | Slurry pellet density (g/cc) |
| --- | --- | --- |
| Example 1 | 3.5 | 1.70 |
| Comparative Example 1 | 2.0 | 1.72 |
| Comparative Example 2 | 3.8 | 1.62 |

Referring to the results of Table 1, the slurry pellets prepared by respectively using the negative active materials according to Example 1 and Comparative Example 1 each had slurry pellet density of greater than or equal to 1.70 g/cc under a pressure of 3.5 tons and 2.0 tons. The results show that an active mass density of greater than or equal to 1.65 g/cc may be obtained and a battery having a high energy density may also be realized.

On the contrary, the slurry pellet prepared by using the negative active material according to Comparative Example 2 showed a low slurry pellet density of 1.62 g/cc (although the pressure is a high pressure of 3.8 tons, and active mass density of greater than or equal to 1.65 g/cc is difficult to obtain). The reason is that the negative active material according to Comparative Example 2 had too high a Young's modulus to be compressed in the press process and, thus, could hardly realize a high active mass density. Accordingly, the negative active material of Comparative Example 2 may not be appropriate for a battery having a high energy density.

Electrolyte Solution Impregnation Experiment

After carefully adding 50 μL of an electrolyte solution obtained by dissolving 1 M $LiPF_6$ in a mixed solvent of ethylene carbonate and dimethyl carbonate (3:7 volume ratio) in a dropwise fashion on a slurry pellet prepared through the process and covering it to prevent evaporation of the electrolyte solution, the time for the electrolyte solution to be completely impregnated into the slurry pellet was measured. The results are provided in FIG. 2.

Figure 2:
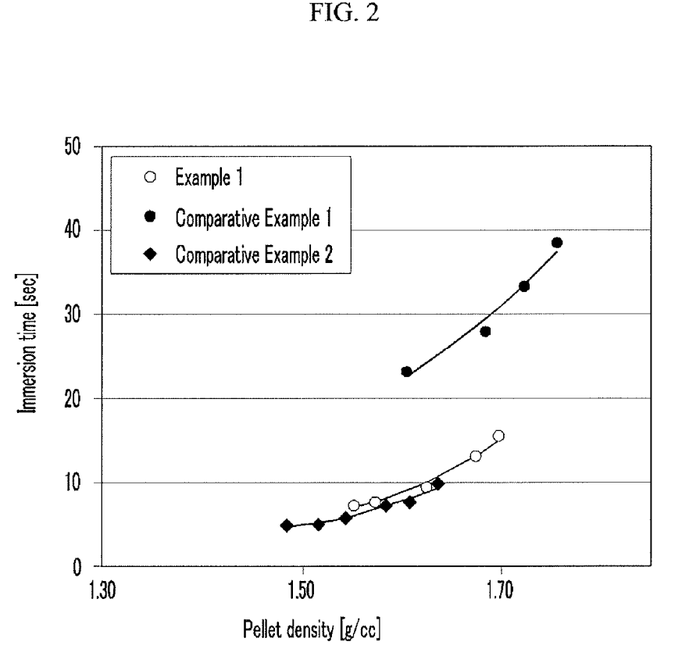
FIG. 2 illustrates a graph showing the electrolyte solution impregnation experiment results of each slurry pellet prepared by respectively using negative active materials according to Example 1 and Comparative Examples 1 and 2.

Referring to the results of FIG. 2, the negative active materials according to Example 1 and Comparative Example 2 showed very short impregnation time of the electrolyte solution. On the contrary, the negative active material according to Comparative Example 1 was twice as slow as the impregnation time of Example 1.

Based on the results of Table 1 and FIG. 2, the Young's modulus should not be too low or too high in order to obtain fast impregnation time, as well as realize high active mass density.

Cycle-life Characteristics and Battery Thickness Increase Rate

Each negative electrode according to Example 1 and Comparative Example 1 was used to fabricate a rechargeable lithium battery cell having theoretical capacity (nominal capacity) of 2000 mAh. The negative electrode according to Comparative Example 2 had no high active mass density and, thus, was not part of the battery experiment. Herein, $LiCoO_2$ was used as a positive electrode and an electrolyte was prepared by dissolving 1 M $LiPF_6$ in a mixed solvent of ethylene carbonate and dimethyl carbonate (3:7 of a volume ratio).

Figure 3:
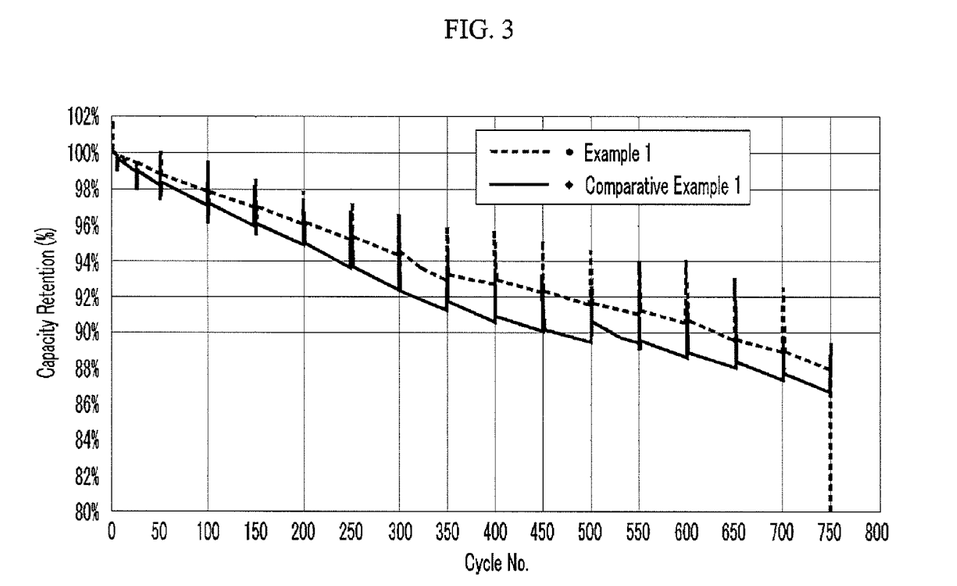
FIG. 3 illustrates a graph showing the capacity retention of each battery cell fabricated by respectively using negative electrodes according to Example 1 and Comparative Example 1.

The fabricated battery cell was charged at 1.0 C under the temperature of 45° C., paused for 5 minutes, discharged at 1.0 C, and paused for 5 minutes. This charge and discharge process as one cycle was repeated 750 times in total. FIG. 3 shows capacity retention as a ratio of discharge capacity at each charge and discharge cycle relative to discharge capacity at the first charge and discharge cycle.

Figure 4:
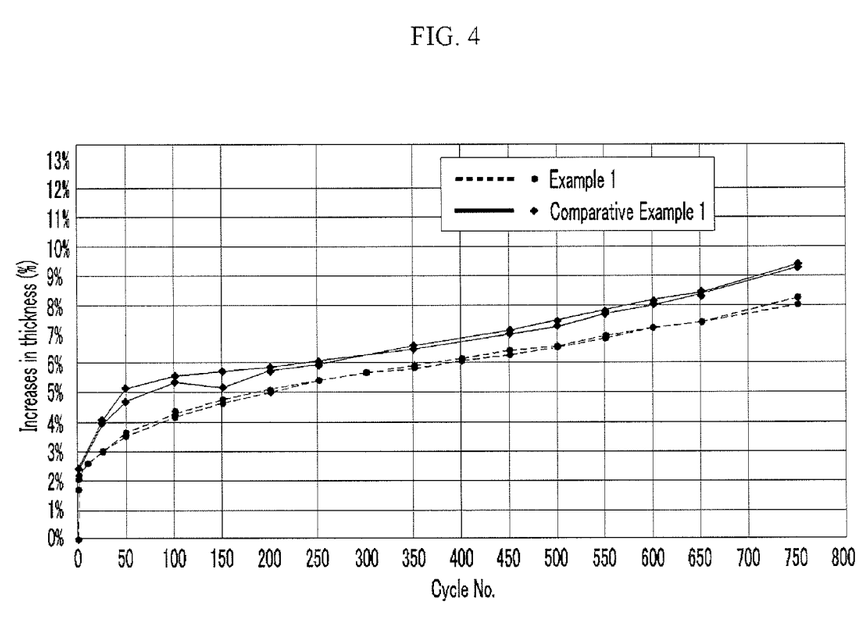
FIG. 4 illustrates a graph showing the battery thickness increase rate of each battery cell fabricated by respectively using the negative electrodes according to Example 1 and Comparative Example 1.

In addition, FIG. 4 shows a thickness increase rate by measuring a battery thickness before the charge and discharge cycles and another battery thickness at each cycle.

As shown in FIG. 3, the negative electrode of Example 1 showed excellent capacity retention compared with the negative electrode of Comparative Example 1, and as shown in FIG. 4, the negative electrode of Example 1 showed a lower thickness increase rate compared with that of Comparative Example 1.

COMPARATIVE EXAMPLE 3

The negative active material slurry of Example 1 was used to prepare a negative electrode having an active mass density of 1.60 g/cc and a current density of 3.0 mAh/cm².

COMPARATIVE EXAMPLE 4

The negative active material slurry of Comparative Example 1 was used to prepare a negative electrode having an active mass density of 1.60 g/cc and a current density of 3.0 mAh/cm².

Cycle-life Characteristics

The negative electrodes according to Comparative Examples 3 and 4 were respectively used to fabricate two rechargeable lithium battery cells having theoretical capacity (nominal capacity) of 2000 mAh. Herein, a positive electrode using $LiCoO_2$ and an electrolyte, which was prepared by dissolving 1 M $LiPF_6$ in a mixed solvent of ethylene carbonate and dimethyl carbonate (3:7 of a volume ratio), were used.

Figure 5:
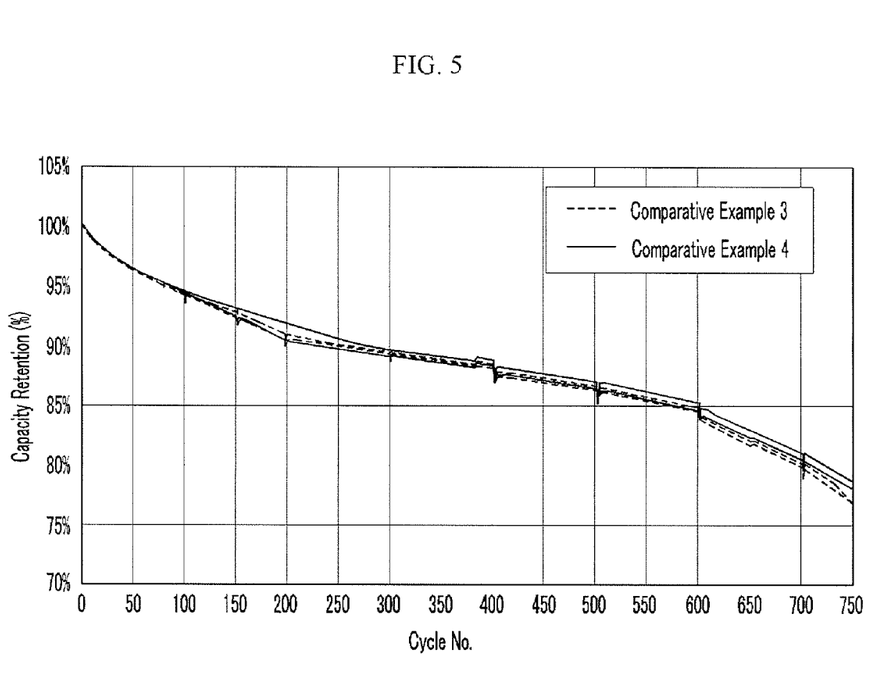
FIG. 5 illustrates a graph showing the capacity retention of each battery cell fabricated by respectively using negative electrodes according to Comparative Examples 3 and 4.

The fabricated battery cells were charged 1.0 C at 45° C., paused for 5 minutes, discharged 1.0 C, and paused for 5 minutes. This charge and discharge process as one charge and discharge cycle was repeated 750 times in total. FIG. 5 shows capacity retention as a ratio of discharge capacity at each charge and discharge cycle relative to discharge capacity at the first charge and discharge cycle.

As shown in FIG. 5, Comparative Example 3 using a negative active material having a Young's modulus of 20 GPa showed similar but low active mass density and current density compared to those of Comparative Example 4 using negative active material having a low Young's modulus of 8 GPa. This result shows that cycle-life characteristics may not be improved by adjusting the Young's modulus when the active mass density and current density are low.

By way of summation and review, a rechargeable lithium battery may use an organic electrolyte solution and thereby may have at least twice the high discharge voltage of a conventional battery using an alkali aqueous solution and, as a result, may have high energy density.

As for positive active materials of a rechargeable lithium battery, a lithium-transition metal oxide having a structure being capable of intercalating lithium ions, such as $LiCoO_2$, $LiMn_2O_4$, $LiNi_{1-x}Co_xO_2$ (0<x<1) and the like, may be used.

As for negative active materials, various carbon-based materials such as artificial graphite, natural graphite, and hard carbon that may intercalate and deintercalate lithium ions have been used. In order to obtain high capacity, silicon-based or tin-based non-carbon-based negative active materials have also been considered.

Exemplary embodiments provide a negative electrode for a rechargeable lithium battery that may have improved cycle-life characteristic and improved swelling characteristics.

A negative active material for a rechargeable lithium battery according to exemplary embodiments may provide negative electrode for a rechargeable lithium battery that may improve high rate charging characteristics and may have a high active mass density.

Exemplary embodiments also provide a rechargeable lithium battery including the negative electrode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a rechargeable lithium battery, the negative electrode consisting of:
    a current collector;
    a layer of an active mass that includes a mixture of a negative active material and a binder, wherein:
    the negative active material in the layer of the active mass has a Young's modulus of about 10 GPa to about 35 GPa,
    the layer of the active mass has an active mass density of about 1.65 g/cc to about 1.85 g/cc, the active mass density indicating weight of the active mass divided by volume of the negative electrode, and
    the negative electrode exhibits a current density of greater than or equal to about 3.2 mAh/cm$^2$.

2. The negative electrode as claimed in claim 1, wherein the current density of the negative electrode is about 3.2 mAh/cm$^2$ to about 4.2 mAh/cm$^2$.

3. The negative electrode as claimed in claim 1, wherein the Young's modulus of the negative active material is about 15 GPa to about 25 GPa.

4. The negative electrode as claimed in claim 1, wherein the negative active material is artificial graphite.

5. A rechargeable lithium battery comprising:
    the negative electrode as claimed in claim 1;
    a positive electrode including a positive active material; and
    an electrolyte.

6. The rechargeable lithium battery as claimed in claim 5, wherein the active mass density of the negative electrode is about 1.65 g/cc to about 1.85 g/cc.

7. The rechargeable lithium battery as claimed in claim 5, wherein the current density of the negative electrode is about 3.2 mAh/cm$^2$ to about 4.2 mAh/cm$^2$.

8. The rechargeable lithium battery as claimed in claim 5, wherein the Young's modulus of the negative active material is about 15 GPa to about 25 GPa.

9. The rechargeable lithium battery as claimed in claim 5, wherein the negative active material is artificial graphite.

* * * * *